US007663800B2

(12) United States Patent
Maeda

(10) Patent No.: US 7,663,800 B2
(45) Date of Patent: Feb. 16, 2010

(54) ELECTROPHORESIS DISPLAY DEVICE AND ELECTRONIC APPARATUS

(75) Inventor: Hiroshi Maeda, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 12 days.

(21) Appl. No.: 12/075,880

(22) Filed: Mar. 15, 2008

(65) Prior Publication Data

US 2008/0239461 A1 Oct. 2, 2008

(30) Foreign Application Priority Data

Mar. 29, 2007 (JP) ............................ 2007-087668

(51) Int. Cl.
*G02B 26/00* (2006.01)
*G09G 3/34* (2006.01)

(52) U.S. Cl. ...................................... 359/296; 345/107

(58) Field of Classification Search ................. 359/296; 345/107; 430/32; 204/600
See application file for complete search history.

(56) References Cited

U.S. PATENT DOCUMENTS 6,956,691 B2 * 10/2005 Kaneko et al. .............. 359/296
2007/0211330 A1 * 9/2007 Ohshima et al. ............ 359/296

FOREIGN PATENT DOCUMENTS

JP 2003-084314 3/2003

* cited by examiner

*Primary Examiner*—William C Choi
(74) *Attorney, Agent, or Firm*—AdvantEdge Law Group, LLC

(57) ABSTRACT

In at least one embodiment of the disclosure, an electrophoreses display device includes a first electrode that is formed in each of a plurality of pixels. A second electrode is formed opposite to the first electrode. An electrophoresis element is sandwiched between the first electrode and the second electrode and has electrophoresis particles that are charged electrically. An adhesive layer is interposed between the electrophoresis element and the first electrode. An insulation layer is formed at a region between each two of the first electrodes that are arrayed adjacent to each other.

13 Claims, 13 Drawing Sheets

| SEQUENCE | OPERATION (TIME PERIOD) | STATE OF POWER LINES | | STATE OF COMMON ELECTRODE 22 | DISPLAY IMAGE |
|---|---|---|---|---|---|
| | | FIRST POWER LINE 13 | SECOND POWER LINE 14 | | |
| 1 | POWER OFF TIME PERIOD | DISCONNECTED | DISCONNECTED | DISCONNECTED | PRECEDING IMAGE |
| 2 | IMAGE SIGNAL INPUT TIME PERIOD | 5V | 0V | DISCONNECTED | NO CHANGE |
| 3 | IMAGE DISPLAY TIME PERIOD | HIGH LEVEL (15V) | LOW LEVEL (0V) | PULSE | NEW IMAGE |
| 4 | POWER OFF TIME PERIOD | DISCONNECTED | DISCONNECTED | DISCONNECTED | NEW IMAGE |

ELECTROPHORESIS DISPLAY DEVICE AND ELECTRONIC APPARATUS

BACKGROUND

1. Technical Field

The present invention relates to an electrophoresis display device and an electronic apparatus.

2. Related Art

In the typical image-display operation of an electrophoresis display device of the related art, an image signal that has been sent via a switching element to a memory circuit is temporarily stored at the memory circuit. Then, the image signal that has been stored at the memory circuit is directly fed to a first electrode. When an electric potential (i.e., voltage) is applied to the first electrode, an electric potential difference is generated between the first electrode and a second electrode. As a result of such an electric potential difference, an electrophoresis element is energized (i.e., driven). In this way, the electrophoresis display device of the related art is capable of displaying an image. An example of the electrophoresis display device of the related art is described in JP-A-2003-84314.

A static random access memory (hereafter abbreviated as "SRAM") or a dynamic random access memory (hereafter abbreviated as "DRAM"), though not limited thereto, is used as a component that constitutes the memory circuit described above.

It is necessary to provide a sufficiently large electric potential difference between a pair of electrodes that sandwiches the electrophoresis element in order for the electrophoresis display device to display an image. For this reason, the power voltage requirement of the memory circuit is 10V or greater. Assuming that one pixel displays a certain color that is not the same as one displayed by another pixel that is adjacent to the above-mentioned one pixel, it follows that a certain electric potential is applied to a first electrode of the above-mentioned one pixel whereas another electric potential, which has a level different from that of the above-mentioned certain electric potential, is applied to a first electrode of the above-mentioned another pixel that is adjacent to the above-mentioned one pixel.

Therefore, a considerably large electric potential difference is generated between the first electrode of the above-mentioned one pixel and the first electrode of the above-mentioned another pixel that is adjacent thereto. For this reason, a leakage current (i.e., leak current) flows, via an adhesive (layer) that is provided/used to adhere the electrophoresis element to a substrate, though not necessarily limited to the adhesive (layer), between the first electrode of the above-mentioned one pixel and the first electrode of the above-mentioned another pixel that is adjacent thereto. Although the amount of a leakage current that flows in each pixel is not so large, the amount thereof that flows in the entire display area of the electrophoresis display device is not negligibly small, resulting in an increase in power consumption.

In addition, there is an adverse possibility that the generation of such a leakage current may bring about chemical reactions in the first electrodes. Therefore, the electrophoresis display device, if it is affected by the chemical reactions, has a high risk of degradation in reliability. As a solution to such a problem, it is possible to increase a resistance to chemical reactions if the first electrode is made of a material that is chemically stable and less vulnerable to corrosion, for example, if it is made of gold or platinum, though not limited thereto. However, disadvantageously, the production cost of the electrophoresis display device inevitably increases if such an expensive material is used.

SUMMARY

An advantage of some aspects of the invention is to provide an electrophoresis display device that is capable of suppressing the generation of a leakage current between pixels, resulting in enhanced reliability as, for example, a product. The invention further provides, as an advantage of some aspects thereof, an electronic apparatus that is provided with such an electrophoresis display device.

In order to address the above-identified problem without any limitation thereto, the invention provides an electrophoresis display device and an electronic apparatus each having the following novel and inventive features.

The invention provides, as a first aspect thereof, an electrophoresis display device having a plurality of pixels that is arrayed in a two-dimensional pattern, the electrophoresis display device including: a first electrode that is formed in each of the pixels; a second electrode that is formed opposite to the first electrode; an electrophoresis element that is sandwiched between the first electrode and the second electrode and has electrophoresis particles that are charged electrically; and an insulation layer that is formed at a region between each two of the first electrodes that are arrayed adjacent to each other. With such a configuration, the electrophoresis display device according to the first aspect of the invention is capable of suppressing the generation of a leakage current between the pixels, resulting in enhanced reliability as, for example, a product because the insulation layer that is formed at a region between each two of the first electrodes that are arrayed adjacent to each other shuts off the leakage current in an effective manner.

The invention provides, as a second aspect thereof, an electrophoresis display device having a plurality of pixels that is arrayed in a two-dimensional pattern, the electrophoresis display device including: a first electrode that is formed in each of the pixels; a second electrode that is formed opposite to the first electrode; an electrophoresis element that is sandwiched between the first electrode and the second electrode and has electrophoresis particles that are charged electrically; and an insulation layer that is formed on the first electrode and has an opening (e.g., open region) over the upper surface of the first electrode. With such a configuration, the electrophoresis display device according to the first aspect of the invention is capable of suppressing the generation of a leakage current between the pixels, resulting in enhanced reliability as, for example, a product because the insulation layer that is formed at a region between each two of the first electrodes that are arrayed adjacent to each other shuts off the leakage current in an effective manner.

In the configuration of the electrophoresis display device according to the second aspect of the invention described above, it is preferable that the insulation layer should be formed to cover a peripheral region of the upper surface of the first electrode. The preferred configuration of the electrophoresis display device described above ensures that the interval between the opening of the insulation layer formed over (the upper surface of) one of the above-mentioned two first electrodes that are arrayed adjacent to each other and the opening of the insulation layer formed over (the upper surface of) the other of the above-mentioned two first electrodes that are arrayed adjacent to each other is relatively large (in comparison with a case where the insulation layer does not cover the peripheral region of the upper surface of the first electrode), which means that the length of the leakage path is relatively large. For this reason, the electrophoresis display device having the preferred configuration described above makes it possible to significantly reduce the amount/likelihood of a leakage current that flows through the opening of the insulation layer formed over the first electrode, thereby further effectively suppressing the leakage current.

In the configuration of the electrophoresis display device according to the first aspect of the invention, it is preferable that the insulation layer should be formed to be in contact with an edge surface of the first electrode. In the preferred configuration of the electrophoresis display device according to the first aspect of the invention described above, the insulation layer shuts off the leakage path that extends or leads from the edge surface of one of the above-mentioned two first electrodes that are arrayed adjacent to each other to the edge surface of the other thereof. By this means, the electrophoresis display device having the preferred configuration described above makes it possible to effectively suppress a leakage current.

In the configuration of the electrophoresis display device according to the first aspect of the invention, the insulation layer may be formed not to be in contact with the first electrode. With such a configuration, the insulation layer shuts off the leakage path between one of the above-mentioned two first electrodes that are arrayed adjacent to each other and the other thereof. By this means, the electrophoresis display device having the alternative configuration described above makes it possible to effectively suppress a leakage current.

In the configuration of the electrophoresis display device according to the first aspect of the invention, it is preferable that the insulation layer should protrude toward the electrophoresis element with respect to the upper surface of the first electrode. In the preferred configuration of the electrophoresis display device according to the first aspect of the invention described above, the insulation layer shuts off the leakage path over a broader shut-off regional range. By this means, the electrophoresis display device having the preferred configuration described above makes it possible to further effectively suppress a leakage current.

In the configuration of the electrophoresis display device according to the first aspect of the invention, it is preferable that the insulation layer should be formed to extend from the upper surface of one of the above-mentioned two first electrodes that are arrayed adjacent to each other to the upper surface of the other of the above-mentioned two first electrodes that are arrayed adjacent to each other. In the preferred configuration of the electrophoresis display device according to the first aspect of the invention described above, the insulation layer covers both the upper surface of the first electrode and the edge surface thereof, which makes the length of the leakage path greater. By this means, the electrophoresis display device having the preferred configuration described above makes it possible to further effectively suppress a leakage current.

In the configuration of the electrophoresis display device according to the first aspect of the invention, it is preferable that the electrophoresis element should be in a capsular form that seals the electrophoresis particles and that the electrophoresis element should be provided over the first electrode in such a manner that an adhesive layer is interposed between the electrophoresis element and the first electrode. With such a configuration, it is possible to make the distribution of the electrophoresis particles inside the electrophoresis element uniform. Thus, the electrophoresis display device having the preferred configuration described above makes it possible to display an image with uniform image-display quality on the basis of an electric potential difference between the first electrode and the second electrode.

In order to address the above-identified problem without any limitation thereto, the invention provides, as a third aspect thereof, an electronic apparatus that is provided with the electrophoresis display device according to the invention. Since an electronic apparatus according to the third aspect of the invention is provided with the electrophoresis display device having the unique features described above, which make it possible to suppress the generation of a leakage current between pixels, the electronic apparatus according to the third aspect of the invention features enhanced reliability as, for example, a product.

BRIEF DESCRIPTION OF THE DRAWINGS

The invention will be described with reference to the accompanying drawings, wherein like numbers reference like elements.

FIG. 7B is a table that shows the image display operation of the electrophoresis display device 1 according to the first embodiment of the invention corresponding to the timing chart of FIG. 7A.

DESCRIPTION OF EXEMPLARY EMBODIMENTS

First Embodiment

Figure 1:
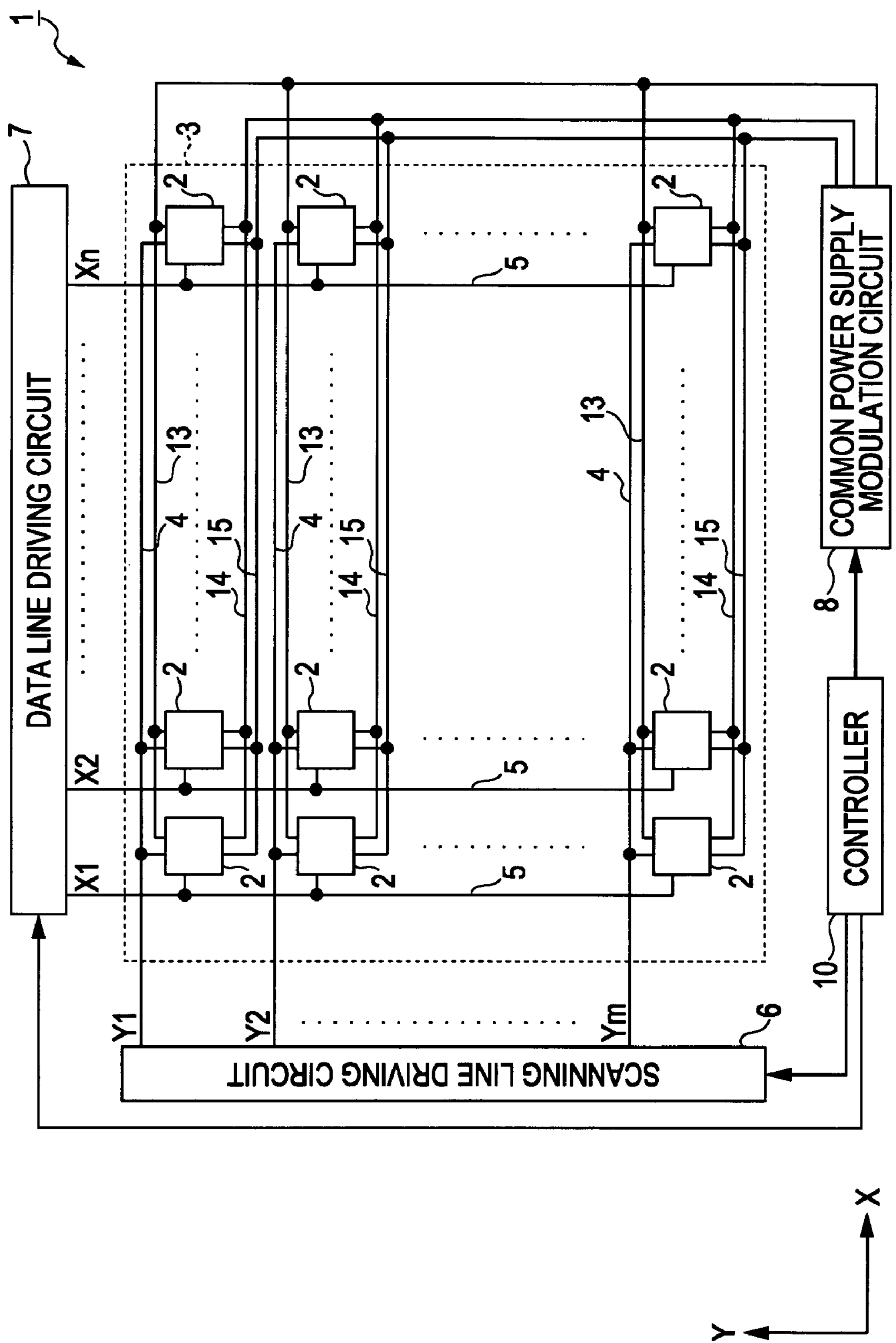
FIG. 1 is a general circuit diagram that schematically illustrates an example of the electric configuration of an electrophoresis display device 1 according to a first embodiment of the invention.

With reference to the accompanying drawings, an electrophoresis display device 1 according to an exemplary embodiment of the invention is explained below. FIG. 1 is a general circuit diagram that schematically illustrates an example of the electric configuration of the electrophoresis display device 1 according to an exemplary embodiment of the invention. The electrophoresis display device 1 is provided with, though not necessarily limited thereto, a display portion (e.g., display area, display unit, though not limited thereto) 3, a scanning line driving circuit 6, a data line driving circuit 7, a common power supply modulation circuit 8, and a controller 10.

A plurality of pixels 2 is formed on the display portion 3. The pixels 2 are arranged in a matrix pattern thereon. In the matrix pattern, M pieces of the pixels 2 are arrayed along the Y direction, whereas N pieces of the pixels 2 are arrayed along the X direction. The scanning line driving circuit 6 is connected to the pixels 2 via a plurality of scanning lines 4 (Y1, Y2, . . . , Ym). Each of the scanning lines 4 extends in the X-axis direction on the display portion 3. The data line driving circuit 7 is connected to the pixels 2 via a plurality of data lines 5 (X1, X2, . . . , Xn). Each of the data lines 5 extends in the Y-axis direction on the display portion 3. The common power supply modulation circuit 8 is connected to the pixels 2 via a common electrode power supply line 15. A controller 10 is responsible for controlling each of the scanning line driving circuit 6, the data line driving circuit 7, and the common power supply modulation circuit 8. Each of a first power line 13, a second power line 14, and the common electrode power supply line 15 constitutes a common line that is shared among all of the pixels 2.

Figure 2:
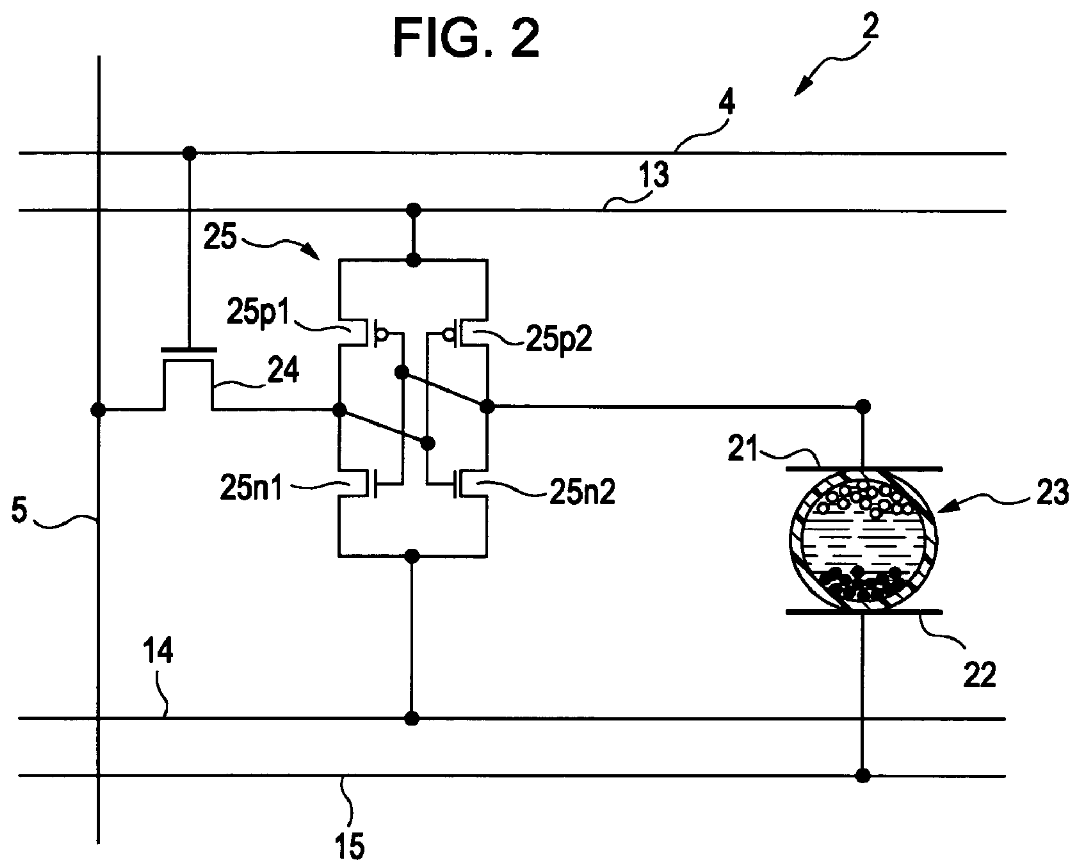
FIG. 2 is a circuit diagram that schematically illustrates an example of the configuration of one of pixels 2.

FIG. 2 is a circuit diagram that schematically illustrates an example of the configuration of one of the pixels 2. In the present embodiment of the invention, the pixel 2 is made up of a driving thin film transistor (hereafter abbreviated as "TFT") 24, the SRAM (Static Random Access Memory) 25, a pixel electrode 21, a common electrode 22, and an electrophoresis element (i.e., electrophoresis device) 23. The driving TFT 24 is a non-limiting example of a switching element (i.e., switching device) according to the invention. The SRAM 25 is a non-limiting example of a memory circuit according to the invention. The pixel electrode 21 is a non-limiting example of "a first electrode" according to the invention. Finally, the common electrode 22 is a non-limiting example of "a second electrode" according to the invention.

The driving TFT 24 is constituted as (i.e., made of) a negative metal oxide semiconductor (hereafter abbreviated as "N-MOS"). The gate electrode of the driving TFT 24 is connected to the scanning line 4. The source electrode of the driving TFT 24 is connected to the data line 5, whereas the drain electrode thereof is connected to the SRAM 25. During a time period in which a selection signal is being inputted therein (i.e., into the driving TFT 24) from the scanning line driving circuit 6 via the scanning line 4, the driving TFT 24 establishes an electric connection between the data line 5 and the SRAM 25. Through the electric connection established by the driving TFT 24 during the application of the selection signal thereto, an image signal that is inputted into the driving TFT 24 from the data line driving circuit 7 via the data line 5 is further inputted into the SRAM 25.

The SRAM 25 is made up of two positive metal oxide semiconductors (hereafter abbreviated as "P-MOS") **25*p*1 and 25*p*2 and two N-MOS 25*n*1 and 25*n*2. The source electrode of the P-MOS 25*p*1 of the SRAM 25 and the source electrode of the P-MOS 25*p*2 thereof are electrically connected to the first power line 13. On the other hand, the source electrode of the N-MOS 25*n*1 of the SRAM 25 and the source electrode of the N-MOS 25*n*2 thereof are electrically connected to the second power line 14**.

The drain electrode of the P-MOS **25*p*1 of the SRAM 25 and the drain electrode of the N-MOS 25*n*1 thereof are electrically connected to the driving TFT 24, the gate electrode of the P-MOS 25*p*2 thereof and the gate electrode of the N-MOS 25*n*2** thereof.

On the other hand, the drain electrode of the P-MOS **25*p*2 of the SRAM 25 and the drain electrode of the N-MOS 25*n*2 thereof are electrically connected to the gate electrode of the P-MOS 25*p*1 thereof and the gate electrode of the N-MOS 25*n*1** thereof.

The SRAM 25 is used to retain an image signal that is sent from the driving TFT 24. In addition, the SRAM 25 is further used to input the image signal into the pixel electrode 21.

The electrophoresis element 23 functions to display an image by means of an electric potential difference between the pixel electrode 21 and the common electrode 22. The common electrode 22 is electrically connected to the common electrode power supply line 15.

Figure 3:
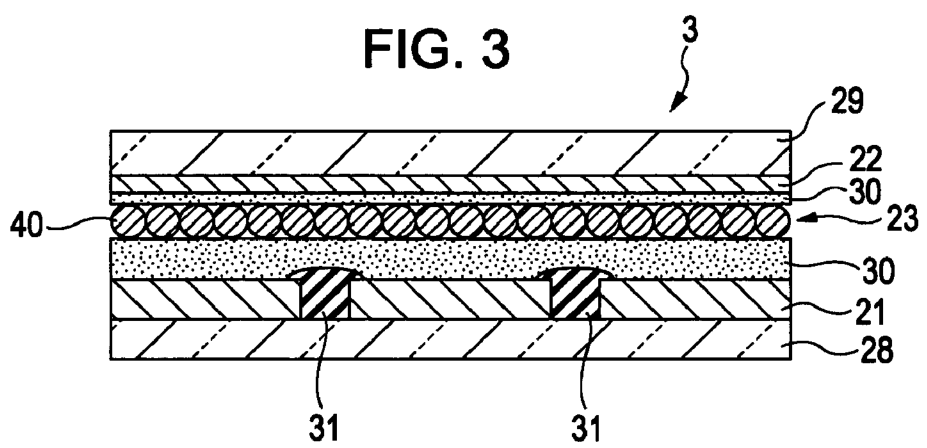
FIG. 3 is a sectional view that schematically illustrates an example of the partial configuration of the display portion 3 of the electrophoresis display device 1 according to the first embodiment of the invention.

FIG. 3 is a sectional view that schematically illustrates an example of the partial configuration of the display portion 3 of the electrophoresis display device 1 according to the present embodiment of the invention. In the configuration of the display portion 3 of the electrophoresis display device 1 according to the present embodiment of the invention, the electrophoresis element 23 is sandwiched between an element substrate 28 and a counter substrate (i.e., opposite substrate) 29. The element substrate 28 has the pixel electrodes 21, whereas the counter substrate 29 has the common electrode 22. The electrophoresis element 23 is made up of a plurality of microcapsules 40. The electrophoresis element 23 is fixed between the element substrate 28 and the counter substrate 29 by means of an adhesive. Therefore, an adhesive layer 30 is interposed between the electrophoresis element 23 and the element substrate 28 as well as between the electrophoresis element 23 and the counter substrate 29. An insulation layer 31 is formed each between two adjacent pixel electrodes 21.

The element substrate 28 is made of, for example, glass or plastic, though not limited thereto. The glass material or the plastic material is molded into a rectangular shape so as to form the element substrate 28. The pixel electrodes 21 are formed on the element substrate 28. The pixel electrode 21 is formed as a rectangular electrode in each of the pixels 2. Though not illustrated in the drawing, the scanning line 4, the data line 5, the first power line 13, the second power line 14, the common electrode power supply line 15, the driving TFT 24, and the SRAM 25, though not limited thereto, which have already been explained above while referring to FIGS. 1 and 2, are formed in a gap region between each two pixel electrodes 21 that are arrayed adjacent to each other and a layer formed under the corresponding pixel electrode 21, which is, for example, close to the element substrate 28.

The counter substrate 29 serves as an image-display-side substrate. Therefore, the counter substrate 29 is made of a transparent material such as glass or the like, which is formed into a rectangular shape. A material that has both optical transparency and electric conductivity is used for the formation of the common electrode 22 on the counter substrate 29. As a non-limiting example of such a transparent and conductive material, a magnesium-silver alloy, mixture, or the like (MgAg), indium tin oxide (ITO), indium zinc oxide (IZO) may be used.

The insulation layer 31 is formed as follows: a thin film (of the insulation layer 31) is formed by using a chemical vapor deposition (CVD) method, a vapor deposition method, a spin coating method, though not limited thereto; and thereafter, a partial region of the film that has been deposited over each of the pixel electrodes 21 is etched away by means of an etching technique or removed by means of any alternative opening-forming or film-removing technique other than the etching method so as to form an opening each thereat.

As a non-limiting material of the insulation layer 31, a resin film that is made of acryl, polycarbonate, polymethyl methacrylate (PMMA), etc., or an inorganic film that is made of $SiO_2$, $Si_3N_4$, $SiN_x$, $Al_2O_3$, etc., is used.

The insulation layer 31 is formed at a region between each two of the pixel electrodes 21 that are arrayed adjacent to each other. In addition, in the configuration of the electrophoresis display device 1 according to the present embodiment of the invention, the insulation layer 31 is formed in such a manner that it further covers the peripheral region of (the upper surface of) the pixel electrode 21. In the illustrated example, the upper surface of the insulation layer 31 protrudes, at least slightly, toward the electrophoresis element 23 with respect to (i.e., when viewed from) the upper surface of the pixel electrode 21. However, the invention is not limited to such an illustrated example. That is, the illustrated configuration may be modified in such a manner that the upper surface of the insulation layer 31 is at the same level as that of the upper surface of the pixel electrode 21.

Figure 4:
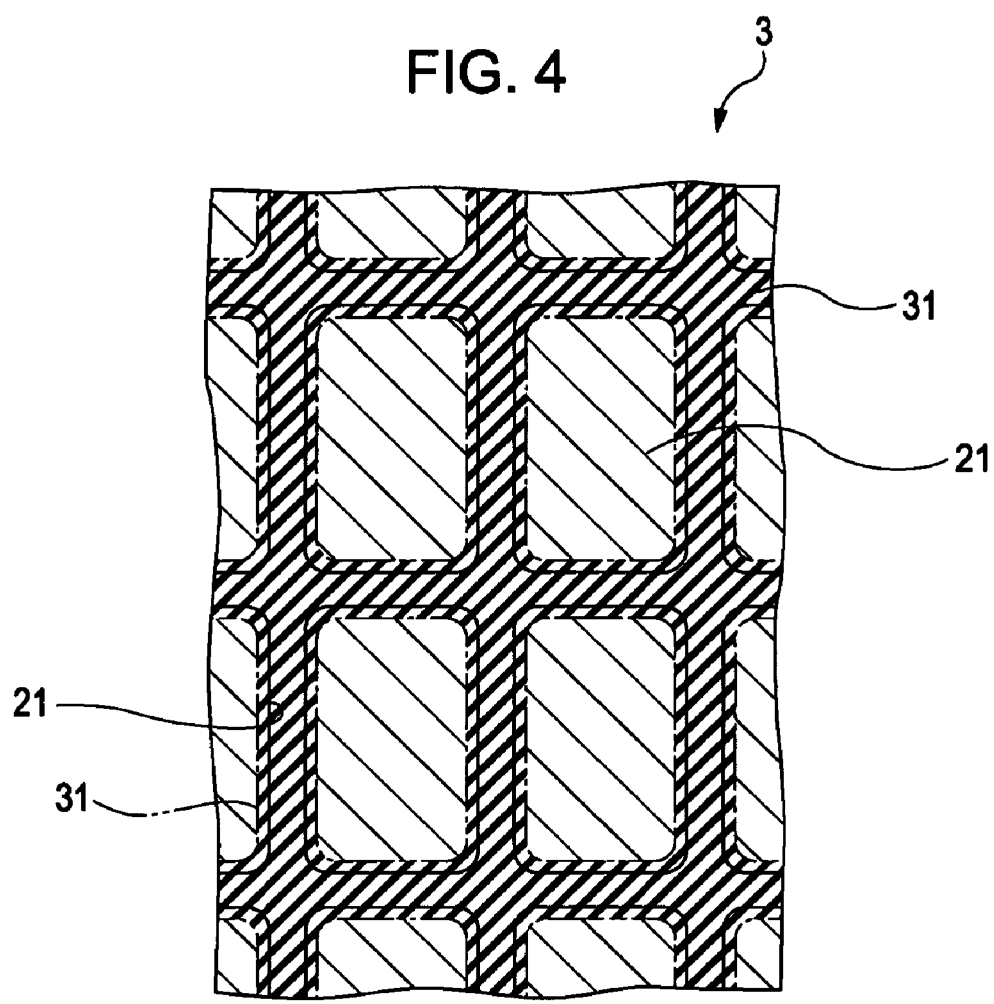
FIG. 4 is a plan view that schematically illustrates an example of the configuration of an insulation layer 31 and a pixel electrode 21 according to the first embodiment of the invention.

FIG. 4 is a plan view that schematically illustrates an example of the configuration of the insulation layer 31 and the pixel electrode 21 that make up the display portion 3 according to the present embodiment of the invention while any components other than the insulation layer 31 and the pixel electrode 21 are omitted therefrom. As shown in FIG. 4, in a plan view, the insulation layer 31 is formed in a grid pattern so as to extend along each gap region between two pixel electrodes 21 arrayed adjacent to each other. A part of the insulation layer 31 is formed to overlie (i.e., overlap in a plan view) the pixel electrode 21 in such a manner that the upper surface of the pixel electrode 21 is rimmed thereby in a frame-like shape.

Figure 5:
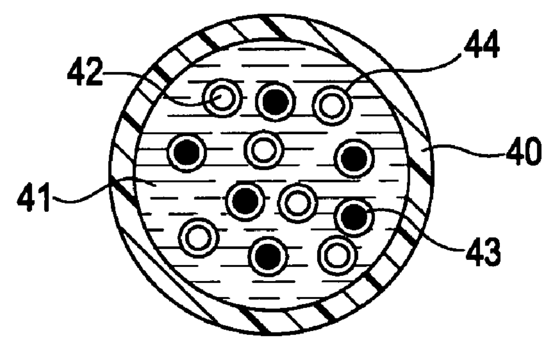
FIG. 5 is a diagram that schematically illustrates an example of the configuration of a microcapsule 40.

FIG. 5 is a diagram that schematically illustrates an example of the configuration of the microcapsule 40. The microcapsule 40 has a diameter of, for example, approximately 50 μm. The microcapsule 40 is made of, for example, an acrylic resin including but not limited to polymethyl methacrylate or polyethyl methacrylate, a urea resin, a polymeric resin having optical transparency such as gum arabic or the like. The microcapsule 40 is sandwiched between the common electrode 22 and the pixel electrode 21. The plurality of microcapsules 40 is arrayed vertically and horizontally in each of the pixels 2. A binder is provided therein so as to fill each gap between the microcapsules 40, thereby supporting the microcapsules 40 in a stable manner. Note that the binder is not illustrated in the drawing.

A dispersion medium 41, a plurality of white particles (electrically charged particles) 42, and a plurality of black particles (electrically charged particles) 43 are sealed inside the microcapsule 40. The plurality of white particles 42 and the plurality of black particles 43 function as electrophoresis particles.

The dispersion medium 41 is a liquid that enables the white particles 42 and the black particles 43 to be dispersed inside the microcapsule 40. The dispersion medium 41 can be formed as a compound of a surfactant (i.e., surface-active agent) and either a single chemical element/material/substance or combined chemical elements/materials/substances that is/are selected from, without any intention to limit thereto: water, alcohol solvent such as methanol, ethanol, isopropanol, butanol, octanol, methyl cellosolve or the like, ester kinds such as ethyl acetate, butyl acetate or the like, ketone kinds such as acetone, methyl ethyl ketone, methyl isobutyl ketone or the like, aliphatic hydrocarbon such as pentane, hexane, octane or the like, alicyclic hydrocarbon such as cyclohexane, methylcyclohexane or the like, aromatic hydrocarbon such as benzene kinds having a long-chain alkyl group such as benzene, toluene, xylene, hexyl benzene, butyl benzene, octyl benzene, nonyl benzene, decyl benzene, undecyl benzene, dodecyl benzene, tridecyl benzene, tetradecyl benzene or the like, halogenated hydrocarbon such as methylene chloride, chloroform, carbon tetrachloride, 1,2-dichloroethane or the like, carboxylate, or any other kind of oil and fat.

The white particle 42 is constituted as, for example, a particle (i.e., high polymer or colloid) made of white pigment such as titanium dioxide, hydrozincite, antimony trioxide or the like. In the present embodiment of the invention, the white particle 42 is charged negatively though not limited thereto.

On the other hand, the black particle 43 is constituted as, for example, a particle (i.e., high polymer or colloid) made of black pigment such as aniline black, carbon black or the like. In the present embodiment of the invention, the black particle 43 is charged positively though not limited thereto.

Having such a configuration, each of the plurality of white particles 42 and the plurality of black particles 43 can move in an electric field that is generated due to an electric potential difference between the pixel electrode 21 and the common electrode 22 in the dispersion medium 41.

If necessary, a charge-controlling agent, a dispersing agent, a lubricant, a stabilizing agent, or the like, may be added to these pigments. The charge-controlling agent may be made of particles of, for example, electrolyte, surface-active agent, metallic soap, resin, gum, oil, varnish, or compound, though not limited thereto. The dispersing agent may be a titaniumsystem coupling agent, an aluminum-system coupling agent, a silane-system coupling agent, though not limited thereto.

An ion existing in the solvent (i.e., dispersion medium 41) covers each of the white particles 42 and the black particles 43. Therefore, an ion layer 44 is formed on the surface of each of the white particles 42 and the black particles 43. An electric double layer is formed each between the electrically-charged white particle 42 and the ion layer 44 as well as each between the electrically-charged black particle 43 and the ion layer 44. Generally speaking, it is known by a person skilled in the art that electrically-charged particles such as the white particles 42 and the black particles 43 do not react even when an electric field of 10 kHz frequency or greater is applied thereto. Therefore, even when such an electric field is applied thereto, these electrically charged particles hardly move. In contrast, it is known by a person skilled in the art that an ion that surrounds each of these charged particles moves when an electric field of 10 kHz frequency or greater is applied thereto because the ion has a far smaller diameter in comparison with that of the charged particle.

Figure 6A:
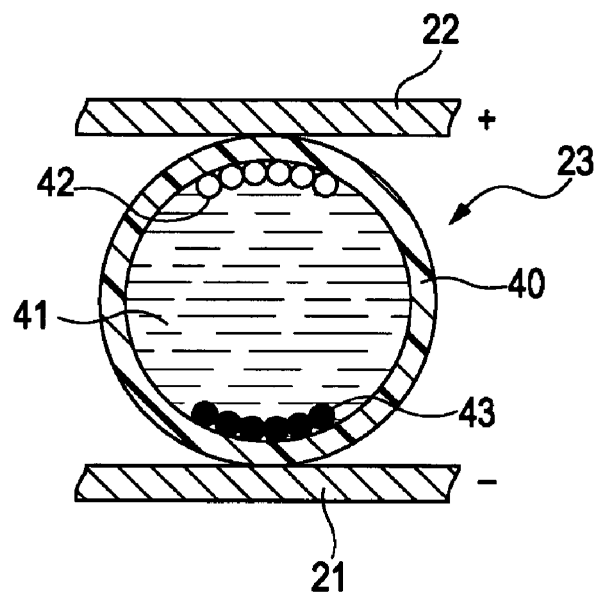
FIGS. 6A and 6B is a set of diagrams that schematically illustrates an example of the operation of the microcapsule 40.
Figure 6B:
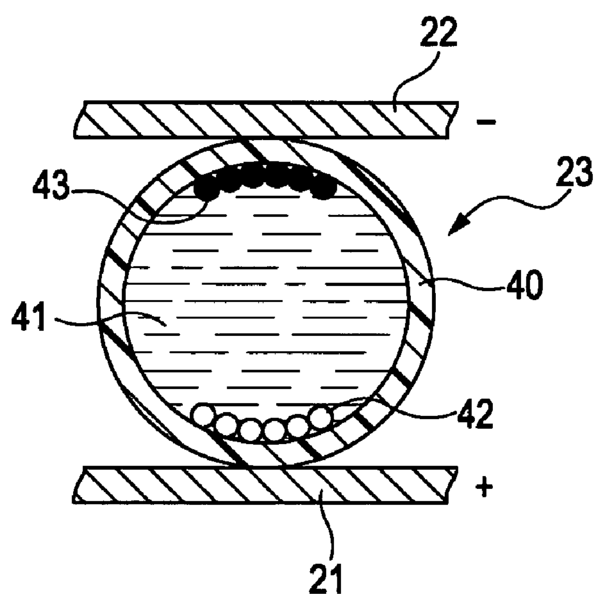

FIGS. 6A and 6B is a set of diagrams that schematically illustrates an example of the operation of the microcapsule 40. In the following description, the operation of the microcapsule 40 is explained while taking an ideal case where the ion layer 44 is not formed as an example. When a voltage is applied in such a manner that the voltage level (i.e., electric potential) of the common electrode 22 is relatively high in comparison with that of the pixel electrode 21, as illustrated in FIG. 6A, the black particles 43, which are positively charged, are drawn to the pixel-electrode (21) side in the microcapsule 40 due to Coulomb force. On the other hand, the white particles 42, which are negatively charged, are drawn to the common-electrode (22) side in the microcapsule 40 due to Coulomb force. Consequently, the white particles 42 gather at the display-surface side of the microcapsule 40. As a result thereof, the color of the white particle 42, that is, white, is displayed on the display surface.

When a voltage is applied in such a manner that the voltage level of the pixel electrode 21 is relatively high in comparison with that of the common electrode 22, as illustrated in FIG. 6B, the white particles 42, which are negatively charged, are drawn to the pixel-electrode (21) side in the microcapsule 40 due to Coulomb force. On the other hand, the black particles 43, which are positively charged, are drawn to the common-electrode (22) side in the microcapsule 40 due to Coulomb force. Consequently, the black particles 43 gather at the display-surface side of the microcapsule 40. As a result thereof, the color of the black particle 43, that is, black, is displayed on the display surface.

The pigments used for the white particles 42 and the black particles 43 described above may be replaced by, for example, red, green, and blue one, though not limited thereto. If so modified, the electrophoresis display device 1 can display, for example, red, green, and blue.

Driving of Electrophoresis Display Device

Next, with reference to the accompanying drawings, an explanation is given below as to how the electrophoresis display device according to the present embodiment of the invention is driven.

Figure 7A:
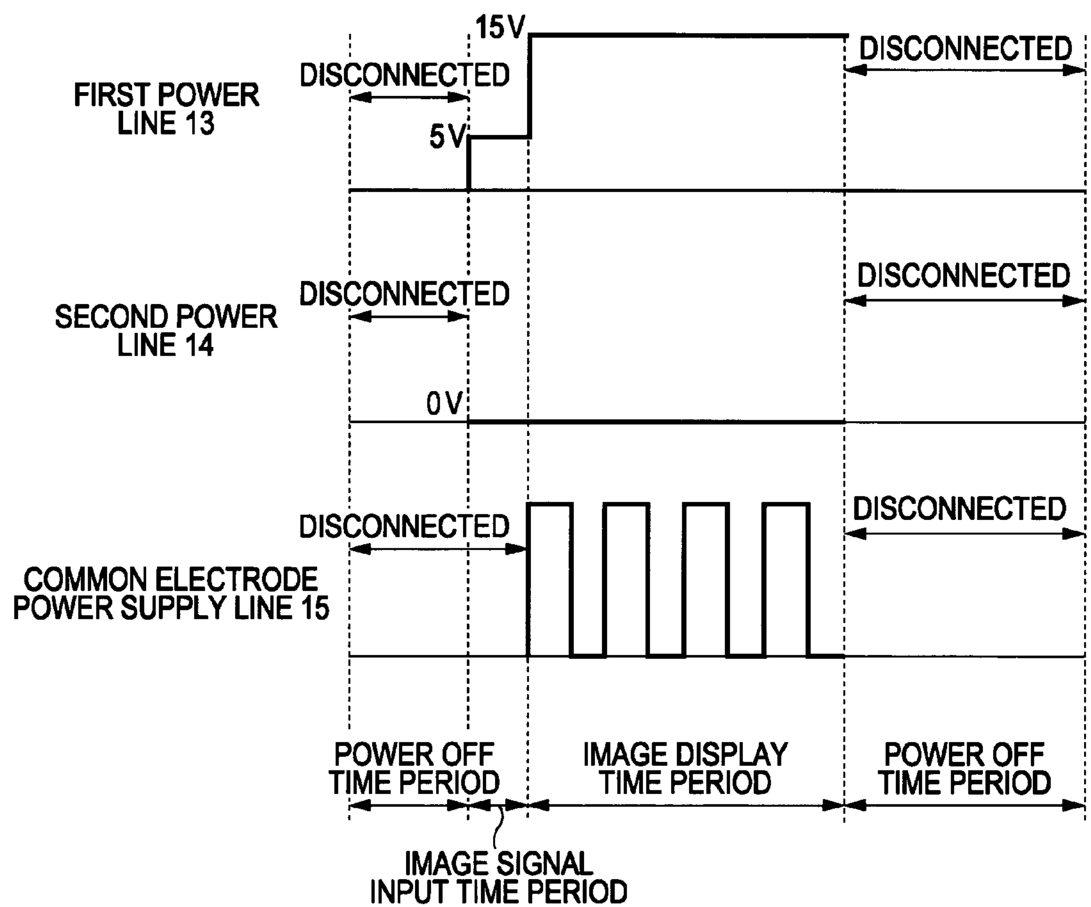
FIG. 7A is a timing chart that shows an example of the operation of the electrophoresis display device 1 according to the first embodiment of the invention.

FIG. 7A is a timing chart that shows an example of the operation of the electrophoresis display device 1 according to the present embodiment of the invention. In the illustrated example, the electrophoresis display device 1 according to the present embodiment of the invention transitions from a power OFF time period to, an image signal input time period, an image display time period, and a power OFF time period in the order of appearance herein in a sequential manner so as to display images. These timing operations are shown in the table of FIG. 7B.

First of all, the image signal input time period (operations performed during the image signal input time period) is explained below. In the image signal input time period, the common power supply modulation circuit 8 that is illustrated in FIG. 1 supplies an electric potential of approximately 5V to the first power line 13, whereas it supplies an electric potential of approximately 0V, which constitutes a low level, to the second power line 14. By this means, the common power supply modulation circuit 8 drives the SRAM 25 shown in FIG. 2.

The scanning line driving circuit 6 supplies a selection signal to the scanning line Y1. Among all of the pixels 2, the driving TFT 24 of each of the pixels 2 that are electrically connected to the scanning line Y1 is driven as a result of the application of the selection signal thereto. Consequently, an electric connection is established between the corresponding data lines X1, X2, . . . , and Xn and the SRAMs 25 of the pixels 2 that are electrically connected to the scanning line Y1 respectively.

The data line driving circuit 7 shown in FIG. 1 supplies an image signal to each of the data lines X1, X2, . . . , and Xn. By this means, the image signal is inputted into each of the SRAMs 25 of the pixels 2 that are electrically connected to the scanning line Y1.

After the image signal has been inputted into each of the SRAMs 25 of the pixels 2 that are electrically connected to the scanning line Y1, the scanning line driving circuit 6 stops the supplying of the selection signal to the scanning line Y1. As a consequence thereof, the pixels 2 that are electrically connected to the scanning line Y1 are deselected (i.e., the selection state thereof is released). Next, the series of operations described above is performed for the pixels 2 that are electrically connected to the scanning line Y2. This is repeated until the pixels 2 that are electrically connected to the scanning line Ym have been selected. By this means, the image signal is inputted into the SRAM 25 of each of all pixels 2.

Next, the image display time period (operations performed during the image display time period) is explained below.

The common power supply modulation circuit 8 supplies a high-level electric potential (i.e., voltage) of approximately 15V to the first power line 13 so as to transition into the image display time period.

As the SRAM 25 turns into a high-level driven state, the level of the image signal that has been inputted into the SRAM 25 at 5V is raised and then retained at the high level.

The common power supply modulation circuit 8 inputs a pulse-pattern signal that has a constant frequency, which alternates (i.e., switches over) between a high-level state (i.e., high-level sub time periods) and a low-level state (i.e., low-level sub time periods), into the common electrode 22 via the common electrode power supply line 15.

Among all of the pixels 2, each of the pixels 2 in which the SRAM 25 thereof has received the input of the image signal having a low level, the SRAM 25 supplies a high-level input to the pixel electrode 21 thereof.

In each of these pixels 2 (HIGH at the pixel electrode 21), a large electric potential difference is generated between the pixel electrode 21 and the common electrode 22 when the electric potential of the common electrode 22 in which the pulse-pattern signal is being inputted is at the low level (LOW at the common electrode 22). As a result of such a large electric potential difference, the white particles 42 are drawn to the pixel electrode 21 whereas the black particles 43 are drawn to the common electrode 22. Consequently, each of these pixels 2 displays black.

On the other hand, among all of the pixels 2, each of the pixels 2 in which the SRAM 25 thereof has received the input of the image signal having an electric potential of 5V, the SRAM 25 supplies a low-level input to the pixel electrode 21 thereof.

In each of these pixels 2 (LOW at the pixel electrode 21), a large electric potential difference is generated between the pixel electrode 21 and the common electrode 22 when the electric potential of the common electrode 22 in which the pulse-pattern signal is being inputted is at the high level (HIGH at the common electrode 22). As a result of such a large electric potential difference, the black particles 42 are drawn to the pixel electrode 21 whereas the white particles 43 are drawn to the common electrode 22. Consequently, each of these pixels 2 displays white.

After the images have been displayed in the image display time period, the common power supply modulation circuit 8 electrically disconnects the first power line 13, the second power line 14, and the common electrode power supply line 15. As these lines become disconnected, the operation of the electrophoresis display device 1 according to the present embodiment of the invention enters the power OFF time period.

Suppression of Leakage Current

Figure 8:
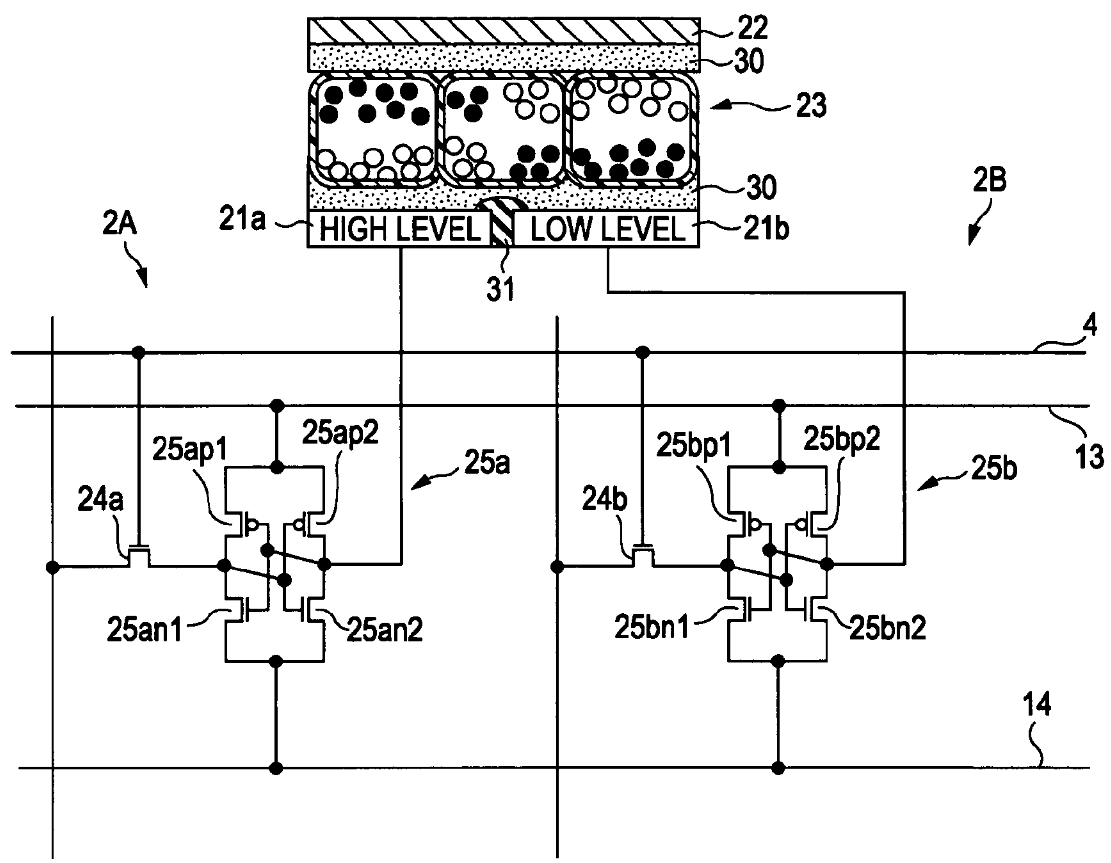
FIG. 8 is a diagram that schematically illustrates an example of two pixels 2 that are arrayed adjacent to each other in the display portion 3 shown in FIG. 1.

FIG. 8 is a diagram that schematically illustrates an example of two pixels 2 that are arrayed adjacent to each other in the display portion 3 shown in FIG. 1.

The left pixel 2A of the illustrated two pixels is provided with a driving TFT 24*a*, an SRAM 25*a*, and a pixel electrode 21*a*. The right pixel 2B of the illustrated two pixels is provided with a driving TFT 24*b*, an SRAM 25*b*, and a pixel electrode 21*b*. The insulation layer 31 is formed between the left pixel electrode 21*a* and the right pixel electrode 21*b*.

The left SRAM 25*a* is made up of P-MOS 25*ap*1, P-MOS 25*ap*2, N-MOS 25*an*1, and N-MOS 25*an*2. The right SRAM 25*b* is made up of P-MOS 25*bp*1, P-MOS 25*bp*2, N-MOS 25*bn*1, and N-MOS 25*bn*2.

A certain electric potential is applied to one of these pixel electrodes 21*a* and 21*b* whereas another electric potential, which has a level different from that of the above-mentioned certain electric potential, is applied to the other, which is adjacent to the above-mentioned one of these pixel electrodes 21*a* and 21*b*. For example, it is assumed herein that a high-level signal is inputted into the pixel electrode 21*a* whereas a low-level signal is inputted into the pixel electrode 21*b*. Therefore, in the illustrated example, the left pixel 2A displays black, whereas the right pixel 2B displays white.

Since an electric field occurs due to a large electric potential difference between the left pixel electrode 21*a* and the right pixel electrode 21*b*, it is most likely that a leakage current flows via the adhesive layer 30.

In the typical configuration of an electrophoresis display device of the related art, the insulation layer 31 is not formed each between two pixel electrodes 21 that are arrayed adjacent to each other unlike the configuration of the present invention illustrated in, for example, FIG. 3. Therefore, in the configuration of the electrophoresis display device of the related art, it is practically impossible or at best difficult to cut off a leakage path. For this reason, in the configuration of the electrophoresis display device of the related art, a leakage current is generated between these two pixel electrodes 21. In contrast, in the configuration of the electrophoresis display device 1 according to the present embodiment of the invention, the insulation layer 31 that is formed each between two pixel electrodes 21 arrayed adjacent to each other shuts off the leakage path, thereby making it possible to effectively suppress a leakage current.

As has already been described above, in the configuration of the electrophoresis display device 1 according to the present embodiment of the invention, the insulation layer 31 is formed in such a manner that it further covers the peripheral region of the upper surface of the pixel electrode 21. Such a configuration ensures that the interval between the upper surface of one pixel electrode 21 (e.g., left pixel electrode 21*a*) that is exposed at the open region of the insulation layer 31 and the upper surface of another adjacent pixel electrode 21 (e.g., right pixel electrode 21*b*) that is exposed at the open region of the insulation layer 31 is relatively large, which means that the length of the leakage path is relatively large. For this reason, the electrophoresis display device 1 according to the present embodiment of the invention makes it possible to effectively suppress a leakage current. That is, in the configuration of the electrophoresis display device 1 according to the present embodiment of the invention, the insulation layer 31 that is formed between these two pixel electrodes 21 shuts off the leakage path that extends or leads from an edge surface (i.e., side surface) of the above-mentioned one pixel electrode 21 thereof to an edge surface of the above-mentioned another adjacent pixel electrode 21 thereof. By this means, the electrophoresis display device 1 according to the present embodiment of the invention makes it possible to effectively suppress a leakage current. In addition thereto, as has already been described above, the upper surface of the insulation layer 31 protrudes, at least slightly, toward the electrophoresis element 23 with respect to the upper surface of the pixel electrode 21 in the configuration of the electrophoresis display device 1 according to the present embodiment of the invention. With such a configuration, it is possible to effectively prevent a leakage current from bypassing the insulation layer 31 (i.e., flowing above the insulation layer 31). Thus, the electrophoresis display device 1 according to the present embodiment of the invention makes it possible to further effectively suppress a leakage current.

Variation Example

Figure 9:
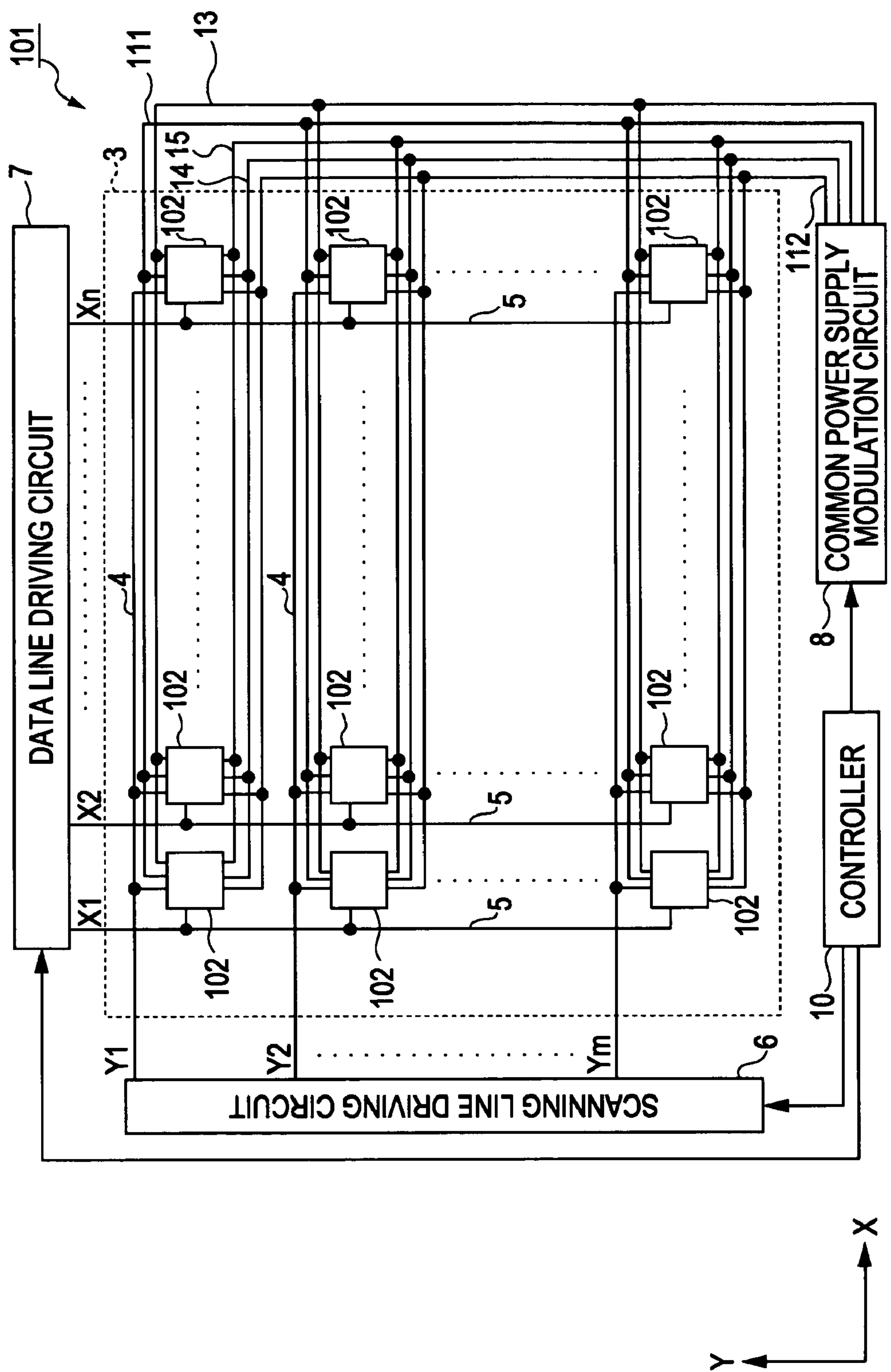
FIG. 9 is a general circuit diagram that schematically illustrates an example of the electric configuration of an electrophoresis display device 101 according to a modification example of the first embodiment of the invention.

FIG. 9 is a general circuit diagram that schematically illustrates an example of the electric configuration of an electrophoresis display device 101 according to a modified embodiment of the invention. The electrophoresis display device 101 according to the modified embodiment of the invention described below differs from the electrophoresis display device 1 according to the foregoing exemplary embodiment of the invention described above in that, in the configuration of the electrophoresis display device 101, a common power supply modulation circuit 108 is electrically connected to pixels 102 via a first control line 111 and a second control line 112.

Figure 10:
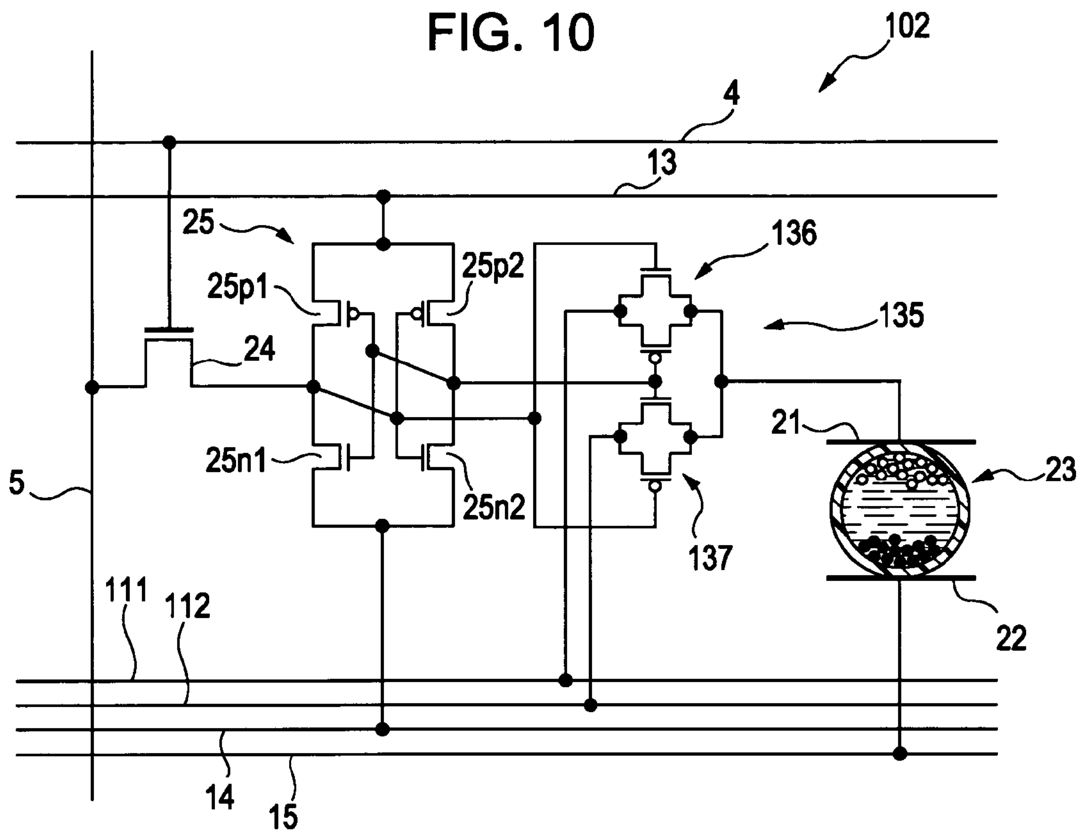
FIG. 10 is a circuit diagram that schematically illustrates an example of the configuration of one of the pixels 102.

FIG. 10 is a circuit diagram that schematically illustrates an example of the configuration of one of the pixels 102. In the configuration of the pixel 102, a switching circuit 135 is provided between the SRAM 25 and the pixel electrode (first electrode) 21. In the modified example illustrated therein, the switching circuit 135 is provided with a first transfer gate 136 and a second transfer gate 137. The transfer gate 136, 137 is made up of a P-MOS and an N-MOS that are connected in parallel.

The gate electrode of the first transfer gate 136 and the gate electrode of the second transfer gate 137 are electrically connected to the SRAM 25. The source electrode of the first transfer gate 136 is electrically connected to the first control line 111. The source electrode of the second transfer gate 137 is electrically connected to the second control line 112. The drain electrode of the first transfer gate 136 and the drain electrode of the second transfer gate 137 are electrically connected to the pixel electrode 21.

In the configuration of the electrophoresis display device 101 shown in FIG. 9, either one of the first transfer gate 136 and the second transfer gate 137 is driven on the basis of an image signal that is inputted into the SRAM 25. Either the first control line 111 or the second control line 112 that is connected to the driven one of these two transfer gates becomes connected to the pixel electrode 21. In other words, the first control line 111 becomes connected to the pixel electrode 21 if the first transfer gate 136 is driven, whereas the second control line 112 becomes connected to the pixel electrode 21 if the second transfer gate 137 is driven. Then, the electric potential of the connected one of these two control lines is inputted into the pixel electrode 21. By this means, an image is displayed at the pixel 102.

An electric field occurs due to an electric potential difference between two of the pixels 102 that are arrayed adjacent to each other in the electrophoresis display device 101 having the circuit configuration shown in FIG. 10, as it occurs in the configuration of the electrophoresis display device 1 described above. However, since the electrophoresis display device 101 is provided with the insulation layer 31 (refer to FIG. 3) each between two adjacent pixel electrodes 21, it is possible to suppress a leakage current.

Second Embodiment

Figure 11:
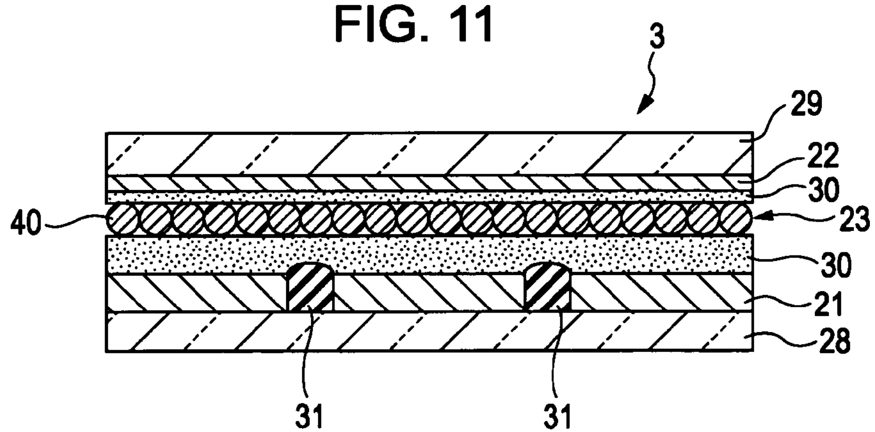
FIG. 11 is a sectional view that schematically illustrates an example of the partial configuration of the display portion 3 of an electrophoresis display device according to a second embodiment of the invention.

FIG. 11 is a sectional view that schematically illustrates an example of the partial configuration of the display portion 3 of an electrophoresis display device according to another exemplary embodiment of the invention.

In the configuration of an electrophoresis display device according to the present embodiment of the invention, the insulation layer 31 is formed at a region between each two of the pixel electrodes 21 that are arrayed adjacent to each other. In addition thereto, especially at the center of the (gap) region between each two of the pixel electrodes 21 that are arrayed adjacent to each other, the upper surface of the insulation layer 31 protrudes, at least slightly, toward the electrophoresis element 23 with respect to the upper surface of the pixel electrode 21 in the configuration of the electrophoresis display device according to the present embodiment of the invention. Notwithstanding the foregoing, the illustrated configuration may be modified in such a manner that the upper surface of the insulation layer 31 is not protruded at all and thus is at the same level as that of the upper surface of the pixel electrode 21 as long as such a non-protruded configuration can still suppress a leakage current to a satisfactory/sufficient level/degree.

Figure 12:
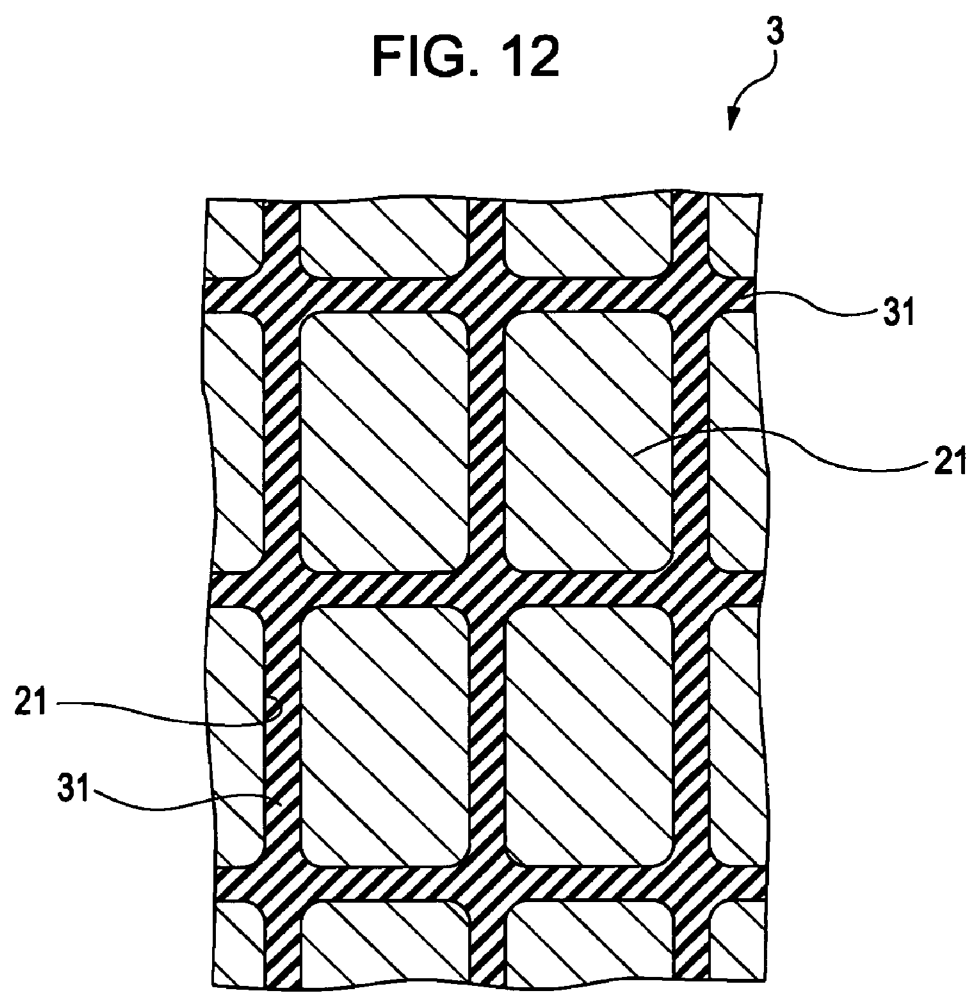
FIG. 12 is a plan view that schematically illustrates an example of the configuration of the insulation layer 31 and the pixel electrode 21 according to the second embodiment of the invention.

FIG. 12 is a plan view that schematically illustrates an example of the configuration of the insulation layer 31 and the pixel electrode 21 that make up the display portion 3 according to the present embodiment of the invention while any components other than the insulation layer 31 and the pixel electrode 21 are omitted therefrom. As shown in FIG. 12, in a plan view, the insulation layer 31 is formed in a grid pattern so as to extend along each gap region between two pixel electrodes 21 arrayed adjacent to each other.

In the configuration of the electrophoresis display device according to the present embodiment of the invention described above, the insulation layer 31 that is formed each between the above-mentioned two pixel electrodes 21 that are arrayed adjacent to each other shuts off the leakage path that extends or leads from an edge surface of one of these two pixel electrodes 21 to an edge surface of the other thereof. By this means, the electrophoresis display device according to the present embodiment of the invention makes it possible to effectively suppress a leakage current. In addition thereto, as has already been described above, the upper surface of the insulation layer 31 protrudes, at least slightly, toward the electrophoresis element 23 with respect to the upper surface of the pixel electrode 21 in the configuration of the electrophoresis display device according to the present embodiment of the invention. With such a configuration, it is possible to effectively prevent a leakage current from bypassing the insulation layer 31; or, in other words, it is possible to effectively prevent a leakage current from flowing above the insulation layer 31. Thus, the electrophoresis display device according to the present embodiment of the invention makes it possible to further effectively suppress a leakage current. In addition thereto, the electrophoresis display device according to the second embodiment of the invention described above makes it possible to increase the size of (i.e., ensure the relatively large size of) the effective image display area of the pixel electrode 21 because no part of the insulation layer 31 is formed to overlie (i.e., overlap in a plan view) the upper surface of the pixel electrode 21.

Third Embodiment

Figure 13:
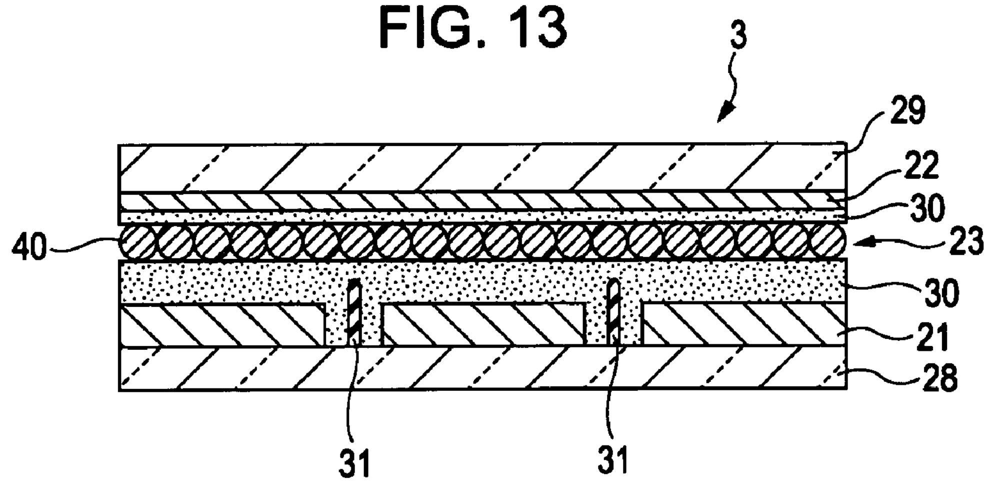
FIG. 13 is a sectional view that schematically illustrates an example of the partial configuration of the display portion 3 of an electrophoresis display device according to a third embodiment of the invention.

FIG. 13 is a sectional view that schematically illustrates an example of the partial configuration of the display portion 3 of an electrophoresis display device according to still another exemplary embodiment of the invention.

In the configuration of the electrophoresis display device according to the present embodiment of the invention, the insulation layer 31 is formed only at the substantial center, and/or in the vicinity thereof, of the (gap) region between each two of the pixel electrodes 21 that are arrayed adjacent to each other, which means that the insulation layer 31 is not in contact with the pixel electrode 21. In addition thereto, the upper surface of the insulation layer 31 protrudes, at least slightly, toward the electrophoresis element 23 with respect to the upper surface of the pixel electrode 21 in the configuration of the electrophoresis display device according to the present embodiment of the invention.

Figure 14:
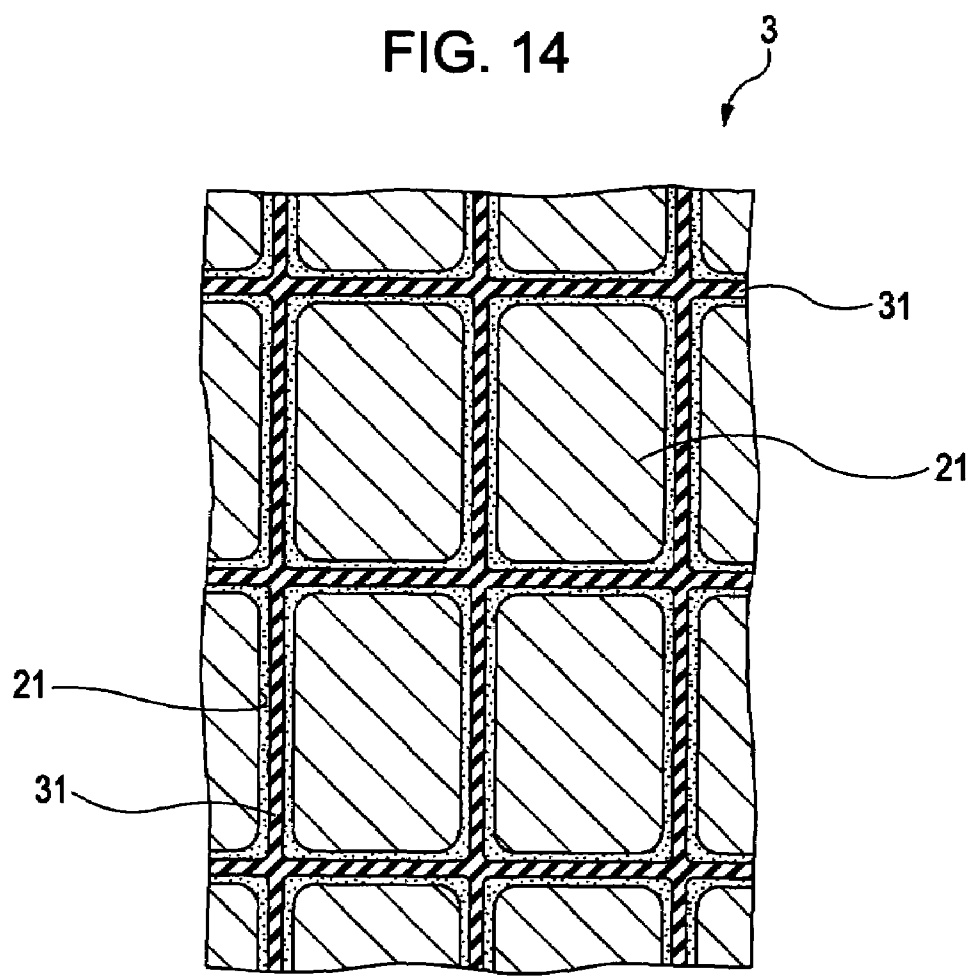
FIG. 14 is a plan view that schematically illustrates an example of the configuration of the insulation layer 31 and the pixel electrode 21 according to the third embodiment of the invention.

FIG. 14 is a plan view that schematically illustrates an example of the configuration of the insulation layer 31 and the pixel electrode 21 that make up the display portion 3 according to the present embodiment of the invention while any components other than the insulation layer 31 and the pixel electrode 21 are omitted therefrom. As shown in FIG. 14, in a plan view, the insulation layer 31 is formed in a slim-line grid pattern so as to extend inside each gap region between two pixel electrodes 21 arrayed adjacent to each other.

In the configuration of the electrophoresis display device according to the present embodiment of the invention described above, the insulation layer 31 that is formed each between the above-mentioned two pixel electrodes 21 that are arrayed adjacent to each other shuts off, not at an edge surface of the pixel electrode 21 but at some point (e.g., the substantial center and/or in the vicinity thereof) of the gap region between each two of the pixel electrodes 21 that are arrayed adjacent to each other, the leakage path that extends or leads from the edge surface of one of these two pixel electrodes 21 to the edge surface of the other thereof. By this means, the electrophoresis display device according to the present embodiment of the invention makes it possible to effectively suppress a leakage current. Each gap groove formed between the pixel electrode 21 and the insulation layer 31 functions as a relief clearance into which any "too-much" adhesive can flow when it is applied thereto. Thanks to such a relief clearance, it is easier to planarize (i.e., flatten) the surface of the adhesive layer 30. In addition thereto, the electrophoresis display device according to the third embodiment of the invention described above makes it possible to increase the size of (i.e., ensure the relatively large size of) the effective image display area of the pixel electrode 21 because no part of the insulation layer 31 is formed to overlie (i.e., overlap in a plan view) the upper surface of the pixel electrode 21.

Fourth Embodiment

Figure 15:
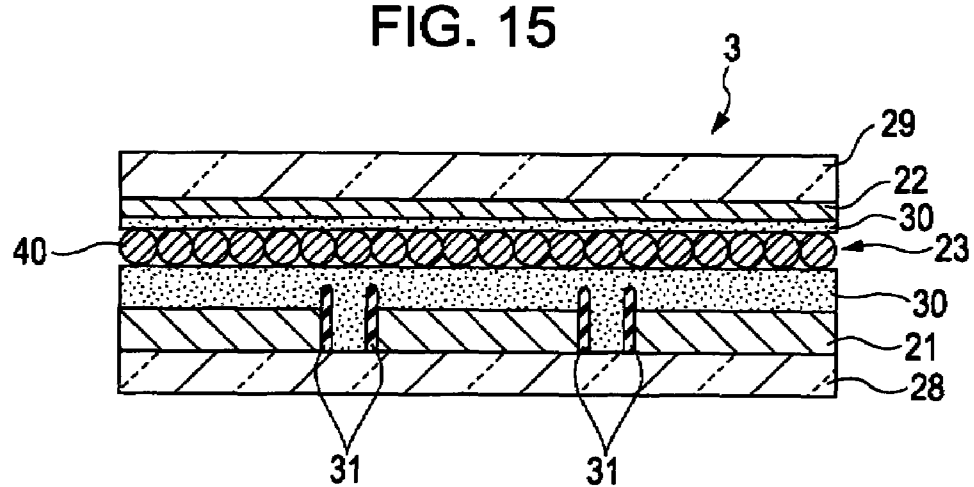
FIG. 15 is a sectional view that schematically illustrates an example of the partial configuration of the display portion 3 of an electrophoresis display device according to a fourth embodiment of the invention.

FIG. 15 is a sectional view that schematically illustrates an example of the partial configuration of the display portion 3 of an electrophoresis display device according to still another exemplary embodiment of the invention.

In the configuration of the electrophoresis display device according to the present embodiment of the invention, (each of) the insulation layer(s) 31 is formed to be in contact with the edge surface of the (corresponding) pixel electrode 21. In addition thereto, the upper surface of the insulation layer 31 protrudes, at least slightly, toward the electrophoresis element 23 with respect to the upper surface of the pixel electrode 21 in the configuration of the electrophoresis display device according to the present embodiment of the invention.

Figure 16:
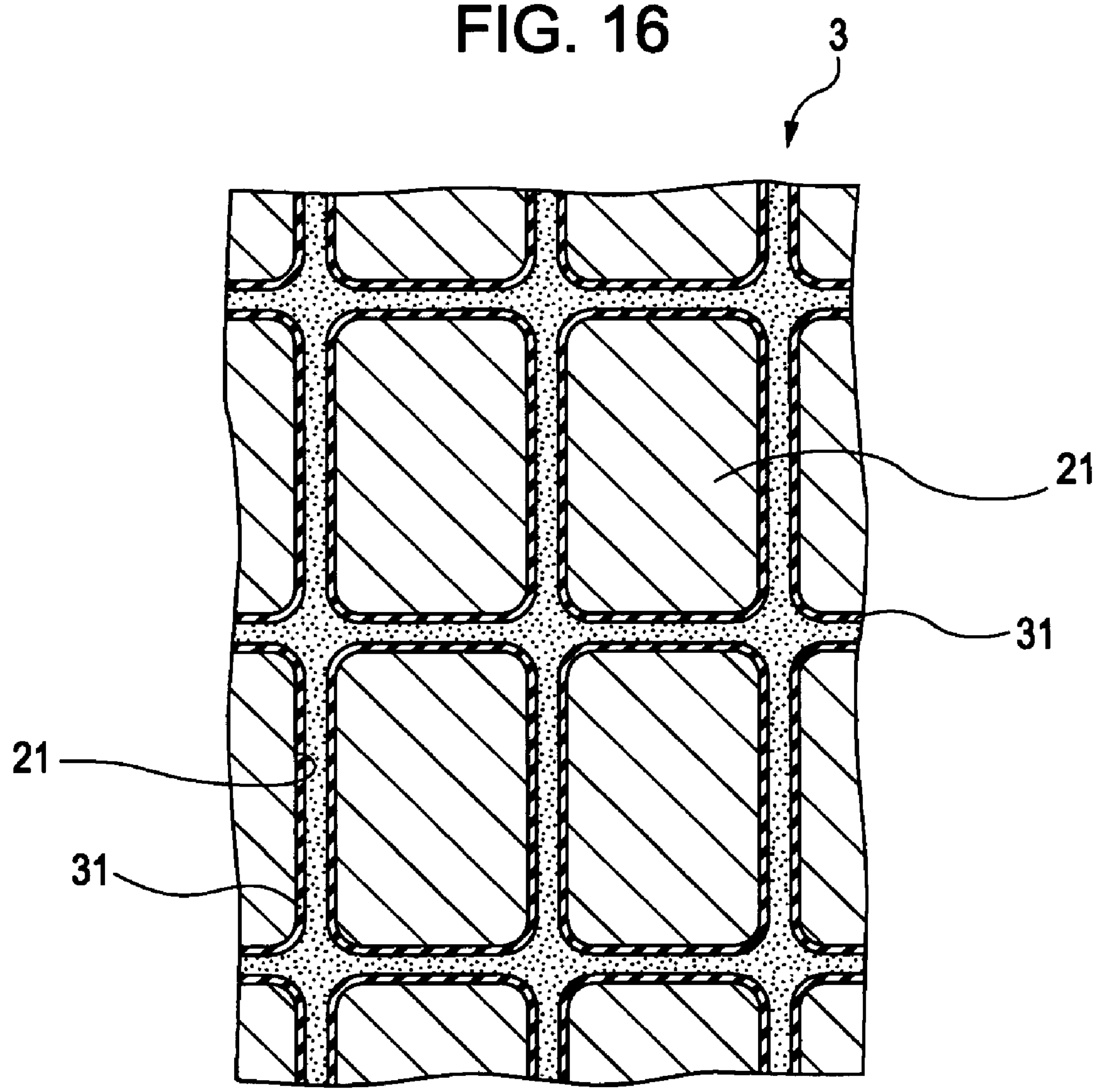
FIG. 16 is a plan view that schematically illustrates an example of the configuration of the insulation layer 31 and the pixel electrode 21 according to the fourth embodiment of the invention.

FIG. 16 is a plan view that schematically illustrates an example of the configuration of the insulation layer 31 and the pixel electrode 21 that make up the display portion 3 according to the present embodiment of the invention while any components other than the insulation layer 31 and the pixel electrode 21 are omitted therefrom. As illustrated in the drawing, the insulation layer 31 is formed to surround the pixel electrode 21.

In the configuration of the electrophoresis display device according to the present embodiment of the invention described above, (each of) the insulation layer(s) 31 that is formed to surround the (corresponding) pixel electrode 21 shuts off leakage of an undesirable current from the edge surface of the pixel electrode 21. That is, the insulation layer 31 shuts off the leakage path that extends or leads from the edge surface of one of two pixel electrodes 21 that are arrayed adjacent to each other to the edge surface of the other thereof. By this means, the electrophoresis display device according to the present embodiment of the invention makes it possible to effectively suppress a leakage current. In addition thereto, as has already been described above, the upper surface of the insulation layer 31 protrudes, at least slightly, toward the electrophoresis element 23 with respect to the upper surface of the pixel electrode 21 in the configuration of the electrophoresis display device according to the present embodiment of the invention. With such a configuration, it is possible to effectively prevent a leakage current from bypassing the insulation layer 31; or, in other words, it is possible to effectively prevent a leakage current from flowing above the insulation layer 31. Thus, the electrophoresis display device according to the present embodiment of the invention makes it possible to further effectively suppress a leakage current. In addition thereto, the electrophoresis display device according to the fourth embodiment of the invention described above makes it possible to increase the size of (i.e., ensure the relatively large size of) the effective image display area of the pixel electrode 21 because no part of the insulation layer 31 is formed to overlie (i.e., overlap in a plan view) the upper surface of the pixel electrode 21.

As a modification example of the configuration described above, the insulation layer 31 may be formed in such a manner that it further covers the peripheral region of the upper surface of the pixel electrode 21. Such a modified configuration ensures that the interval between the upper surface of one pixel electrode 21 that is exposed at the open region of the insulation layer 31 and the upper surface of another adjacent pixel electrode 21 that is exposed at the open region of the insulation layer 31 is relatively large, which means that the length of the leakage path is relatively large. For this reason, the modified configuration described above makes it possible to further effectively suppress a leakage current.

Electronic Apparatus

Figure 17:
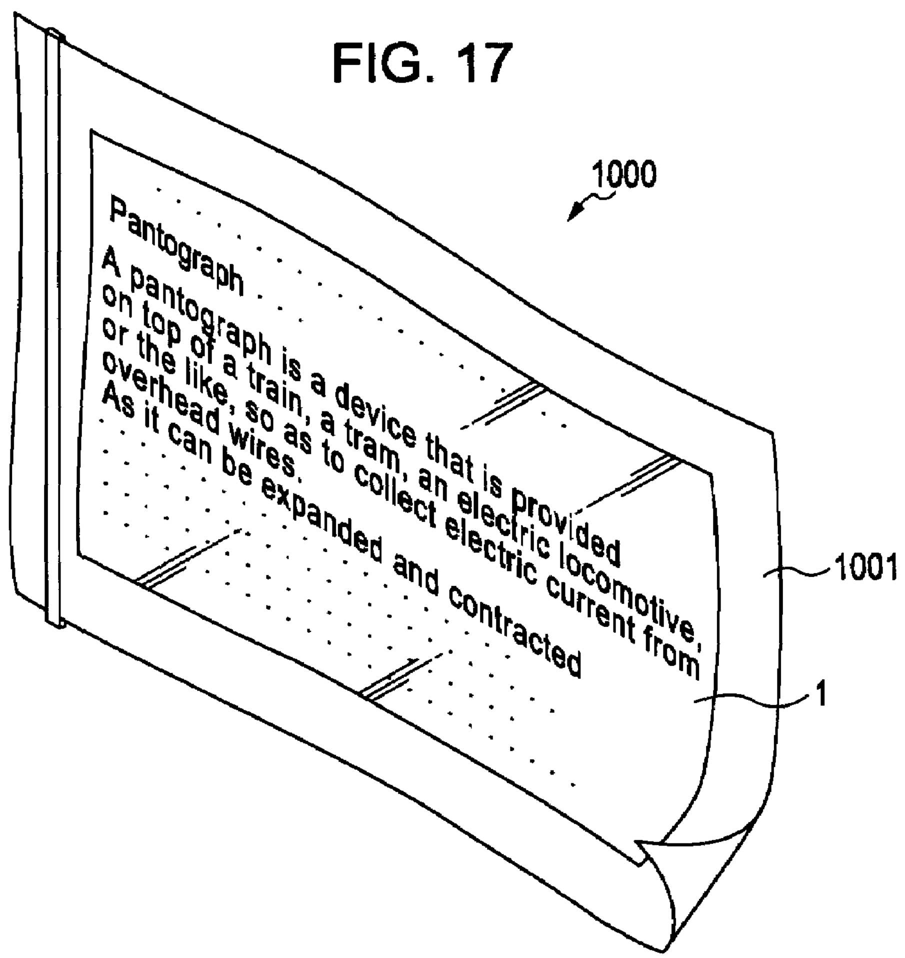
FIG. 17 is a diagram that schematically illustrates an example of the configuration of an electronic apparatus that is provided with an electrophoresis display device according to an exemplary embodiment of the invention (e.g., the electrophoresis display device 1 according to the first embodiment of the invention, though not limited thereto).

FIG. 17 is a diagram that schematically illustrates an example of the configuration of an electronic apparatus that is provided with an electrophoresis display device according to an exemplary embodiment of the invention (e.g., the electrophoresis display device 1 according to the first embodiment of the invention, though not limited thereto). The electrophoresis display device 1 according to the first embodiment of the invention, though not limited thereto, can be applied to a variety of electronic apparatuses. In the following description, an explanation is given of a few non-limiting examples of an electronic apparatus that is provided with the electrophoresis display device 1 according to the first embodiment of the invention. As a first example, a flexible sheet of electronic paper to which the electrophoresis display device 1 according to the first embodiment of the invention is applied is explained. FIG. 17 shows, in a perspective view, an example of the configuration of electronic paper. Electronic paper 1000 has the electrophoresis display device 1 according to the first embodiment of the invention, though not limited thereto, as its display unit (display portion). A main body portion 1001 of the electronic paper 1000 is made of a sheet material that has almost the same texture and flexibility as those of conventional paper (i.e., normal non-electronic paper). The electrophoresis display device 1 according to the first embodiment of the invention is provided on the surface of the main body portion 1001 so as to constitute the electronic paper 1000.

Figure 18:
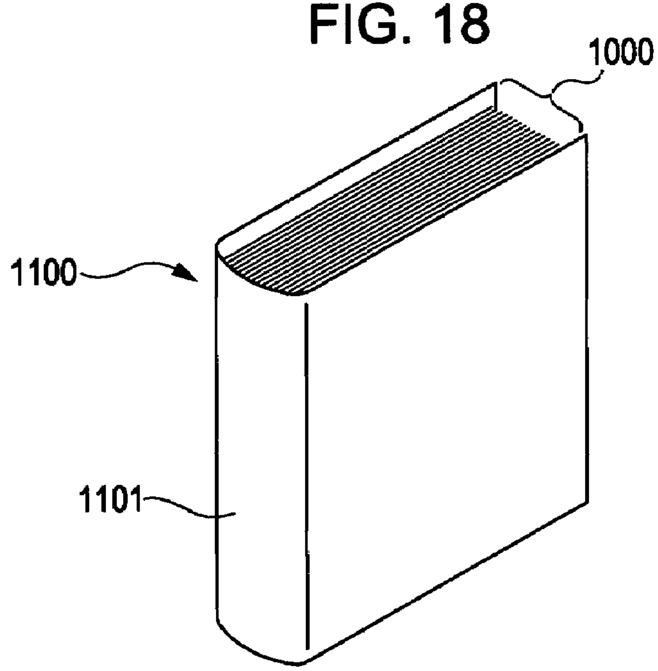
FIG. 18 is a diagram that schematically illustrates another example of the configuration of an electronic apparatus that is provided with an electrophoresis display device according to an exemplary embodiment of the invention (e.g., the electrophoresis display device 1 according to the first embodiment of the invention, though not limited thereto).

As a second example of an electronic apparatus that is provided with the electrophoresis display device 1 according to the first embodiment of the invention, though not limited thereto, FIG. 18 shows an example of the configuration of an electronic notebook 1100 in a perspective view. The electronic notebook 1100 has a plurality of sheets of the electronic paper 1000 illustrated in FIG. 17. The electronic notebook 1100 is further provided with a book jacket 1101, which covers the sheets of electronic paper 1000. The book jacket 1101 is provided with a display data input unit that supplies (i.e., inputs) display data that has been sent from, for example, an external device. The display data input unit is not shown in the drawing. Having such a configuration, the electronic notebook 1100 illustrated in FIG. 18 is capable of changing and/or updating (i.e., overwriting) display content in accordance with the supplied display data without any necessity to unbind the electronic paper 1000.

Among a variety of electronic apparatuses to which the electrophoresis display device according to the invention could be embodied are, in addition to the electronic apparatus (electronic paper and electronic notebook) explained above with reference to FIGS. 17 and 18, a liquid crystal display television, a viewfinder-type video tape recorder, a video tape recorder of a direct monitor view type, a car navigation device, a pager, an electronic personal organizer, an electronic calculator, a word processor, a workstation, a videophone, a POS terminal, a touch-panel device, and so forth. An electrophoresis display device according to an exemplary embodiment of the invention (e.g., the electrophoresis display device 1 according to the first embodiment of the invention, though not limited thereto) can be adopted as the display unit of a variety of electronic apparatuses including but not limited to those enumerated above.

What is claimed is:

1. An electrophoresis display device having a plurality of pixels that is arrayed in a two-dimensional pattern, the electrophoresis display device comprising:

a first electrode that is formed in each of the pixels;

a second electrode that is formed opposite to the first electrode;

an electrophoresis element provided over the first electrode and sandwiched between the first electrode and the second electrode and having electrophoresis particles that are charged electrically;

an adhesive layer interposed between the electrophoresis element and the first electrode; and an insulation layer that is formed at a region between each two of the first electrodes that are arrayed adjacent to each other.

2. The electrophoresis display device according to claim 1, wherein the insulation layer is formed to be in contact with an edge surface of the first electrode.

3. The electrophoresis display device according to claim 1, wherein the insulation layer is formed not to be in contact with the first electrode.

4. The electrophoresis display device according to claim 1, wherein the insulation layer protrudes toward the electrophoresis element with respect to the upper surface of the first electrode.

5. The electrophoresis display device according to claim 1, wherein the insulation layer is formed to extend from the upper surface of one of the above-mentioned two first electrodes that are arrayed adjacent to each other to the upper surface of the other of the above-mentioned two first electrodes that are arrayed adjacent to each other.

6. The electrophoresis display device according to claim 1, wherein the electrophoresis element is in a capsular form that seals the electrophoresis particles.

7. An electronic apparatus that is provided with the electrophoresis display device according to claim 1.

8. An electrophoresis display device having a plurality of pixels that is arrayed in a two-dimensional pattern, the electrophoresis display device comprising:

a first electrode that is formed in each of the pixels;

a second electrode that is formed opposite to the first electrode;

an electrophoresis element provided over the first electrode and sandwiched between the first electrode and the second electrode and having electrophoresis particles that are charged electrically;

an adhesive layer interposed between the electrophoresis element and the first electrode; and an insulation layer that is formed on the first electrode and has an opening over an upper surface of the first electrode.

9. The electrophoresis display device according to claim 8, wherein the insulation layer is formed to cover a peripheral region of the upper surface of the first electrode.

10. The electrophoresis display device according to claim 8, wherein the insulation layer protrudes toward the electrophoresis element with respect to the upper surface of the first electrode.

11. The electrophoresis display device according to claim 8, wherein the electrophoresis element is in a capsular form that seals the electrophoresis particles.

12. An electronic apparatus that is provided with the electrophoresis display device according to claim 8.

13. An electrophoresis display device having a plurality of pixels that is arrayed in a two-dimensional pattern, the electrophoresis display device comprising:

a first electrode that is formed in each of the pixels;

a second electrode that is formed opposite to the first electrode;

an electrophoresis element that is sandwiched between the first electrode and the second electrode and has electrophoresis particles that are charged electrically; and an insulation layer that is formed at a region between each two of the first electrodes that are arrayed adjacent to each other, the insulation layer formed so as not to be in contact with the first electrodes.

* * * * *